US012604270B2

(12) United States Patent
Zhang et al.

(10) Patent No.: US 12,604,270 B2
(45) Date of Patent: Apr. 14, 2026

(54) METHOD TO FAST RECOVER UE FROM PS CALL FAILURE IN 5G NSA

(71) Applicant: QUALCOMM Incorporated, San Diego, CA (US)

(72) Inventors: Fojian Zhang, Shenzhen (CN); Jian Li, Shanghai (CN); Chaofeng Hui, Beijing (CN); Quanling Zhang, Shanghai (CN); Hao Zhang, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 899 days.

(21) Appl. No.: 17/760,307

(22) PCT Filed: Apr. 7, 2020

(86) PCT No.: PCT/CN2020/083443
§ 371 (c)(1),
(2) Date: Aug. 8, 2022

(87) PCT Pub. No.: WO2021/203228
PCT Pub. Date: Oct. 14, 2021

(65) Prior Publication Data
US 2023/0072061 A1 Mar. 9, 2023

(51) Int. Cl.
*H04W 52/02* (2009.01)
*H04W 36/00* (2009.01)
*H04W 76/16* (2018.01)

(52) U.S. Cl.
CPC . *H04W 52/0235* (2013.01); *H04W 36/00698* (2023.05); *H04W 76/16* (2018.02)

(58) Field of Classification Search
CPC ..... H04W 76/15; H04W 52/28; H04W 24/02; H04W 36/00698; H04W 28/0865;
(Continued)

(56) References Cited

U.S. PATENT DOCUMENTS

2015/0230070 A1 8/2015 Kadiyala
2018/0351659 A1* 12/2018 Nimmala ............... H04B 15/02
(Continued)

FOREIGN PATENT DOCUMENTS

CN 104160762 A 11/2014
CN 110636593 A 12/2019
(Continued)

OTHER PUBLICATIONS

3GPP TS 32.425: "3rd Generation Partnership Project, Technical Specification Group Services and System Aspects, Telecommunication Management, Performance Management (PM), Performance Measurements Evolved Universal Terrestrial Radio Access Network (E-UTRAN) (Release 10)", 3rd Generation Partnership Project, Mobile Competence Centre, 650, Route Des Lucioles, F-06921 Sophia-Antipolis Cedex, France, No. V10.0.0, Apr. 1, 2010, pp. 1-49, XP050402312, e.g. clause A.2.
(Continued)

*Primary Examiner* — Omer S Mian
(74) *Attorney, Agent, or Firm* — Polsinelli LLP

(57) ABSTRACT

Embodiments include systems and methods for enabling fast recovery by a user equipment (UE) from packet switched (PS) call failure in a fifth generation (5G) non-standalone (NSA) network. Various embodiments for recovering from PS call failure in a 5G NSA network may include determining whether a total number of Evolved Packet System (EPS) bearer deactivation requests received from a base station of a 5G NSA network during a time period exceeds a maximum counter value, and disabling 5G data calls on the UE in response to determining that the total number of EPS bearer deactivation requests received from the base station of the 5G NSA network during the time period exceeds the maximum counter value.

24 Claims, 8 Drawing Sheets

(58) Field of Classification Search
CPC ....... H04W 36/00222; H04W 52/0235; H04W 24/10; H04W 8/22; H04W 76/16; H04W 88/06; H04W 36/0088; H04W 76/19; H04W 76/36; Y02D 30/70
See application file for complete search history.

(56) References Cited

U.S. PATENT DOCUMENTS

| | | | |
|---|---|---|---|
| 2019/0268845 A1* | 8/2019 | Koshta ..................... | H04W 4/70 |
| 2019/0281506 A1 | 9/2019 | Chiang et al. | |
| 2019/0281648 A1 | 9/2019 | Liu et al. | |
| 2020/0128463 A1* | 4/2020 | Reddiboyana ........ | H04W 76/15 |
| 2021/0127447 A1* | 4/2021 | Zhang ................... | H04W 76/19 |
| 2021/0298106 A1* | 9/2021 | Jha .......................... | H04W 8/24 |
| 2024/0022926 A1* | 1/2024 | Prabhakar ............ | H04B 7/0834 |

FOREIGN PATENT DOCUMENTS

| | | |
|---|---|---|
| CN | 110637477 A | 12/2019 |
| EP | 2824981 A1 | 1/2015 |
| WO | 2015070420 A1 | 5/2015 |
| WO | 2015123596 | 8/2015 |

OTHER PUBLICATIONS

Supplementary European Search Report—EP20930421—Search Authority—BERLIN—Dec. 6, 2023 8 pages.
ZTE: "Clarification on the T-AOS with the Falied Resources Allocation", S2-163639_23.292CR0232_Clarification On the T-ADS with the Falied Resources Allocation, SA WG2 Meeting #116, S2-163639, 3rd Generation Partnership Project, Mobile Competence Centre, 650, Route Des Lucioles, F-06921 Sophia-Antipolis Cedex, France, vol. SA WG2, No. Vienna, Austria, Jul. 11, 2016-Jul. 15, 2016, Jul. 10, 2016, XP051118222, 3 pages, the whole document.
China Telecom: "Service Based Inter-RAT Cell Reselection", 3GPP TSG-RAN WG2# 100, R2-1712962, Reno, USA, Nov. 28-Dec. 1, 2017, The Whole Document; 2 pages.
International Search Report and Written Opinion—PCT/CN2020/083443—ISA/EPO—Dec. 30, 2020; 9 pages.

* cited by examiner

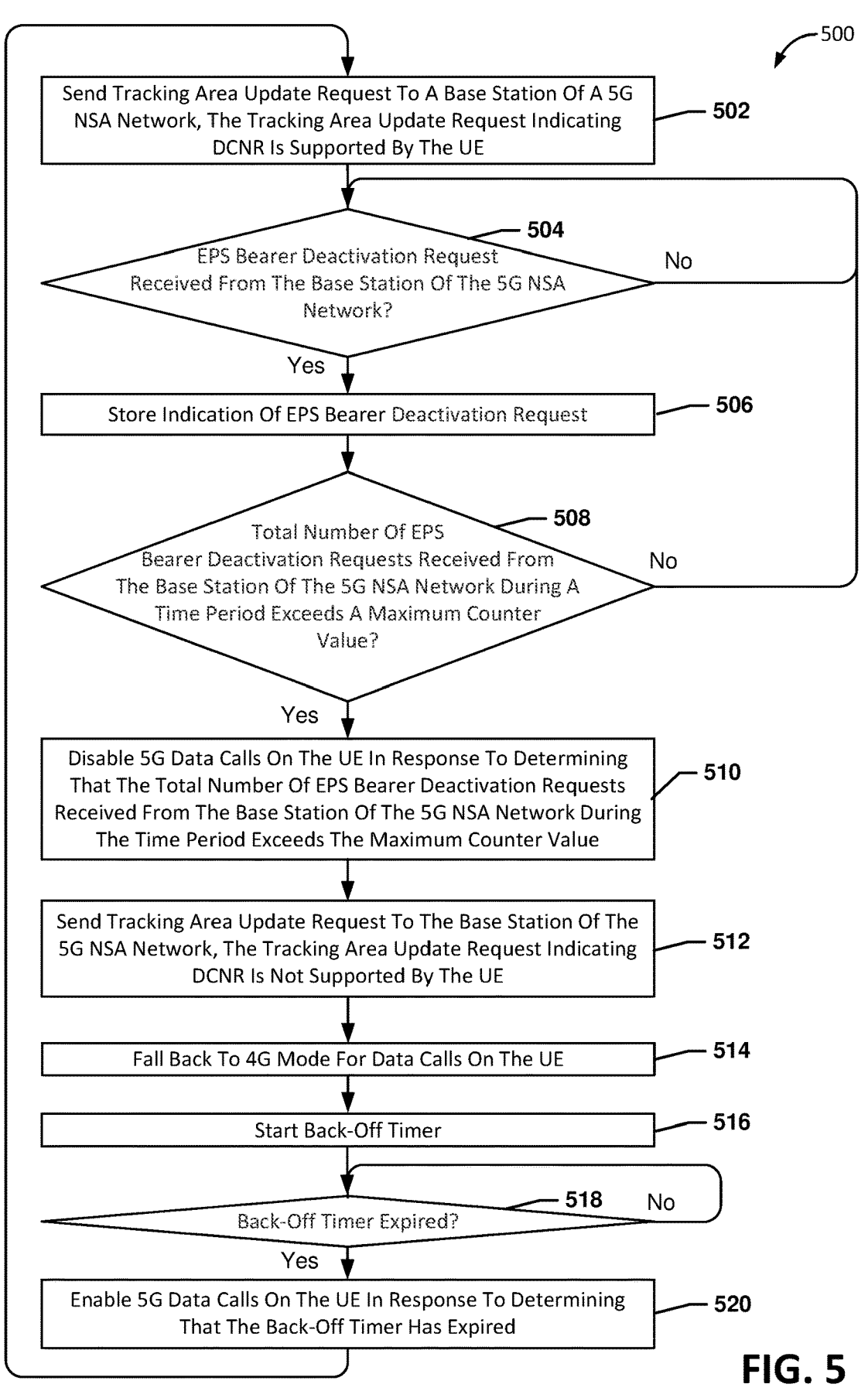

500

Send Tracking Area Update Request To A Base Station Of A 5G NSA Network, The Tracking Area Update Request Indicating DCNR Is Supported By The UE — 502

EPS Bearer Deactivation Request Received From The Base Station Of The 5G NSA Network? — 504    No Yes Store Indication Of EPS Bearer Deactivation Request — 506

Total Number Of EPS Bearer Deactivation Requests Received From The Base Station Of The 5G NSA Network During A Time Period Exceeds A Maximum Counter Value? — 508    No Yes Disable 5G Data Calls On The UE In Response To Determining That The Total Number Of EPS Bearer Deactivation Requests Received From The Base Station Of The 5G NSA Network During The Time Period Exceeds The Maximum Counter Value — 510

Send Tracking Area Update Request To The Base Station Of The 5G NSA Network, The Tracking Area Update Request Indicating DCNR Is Not Supported By The UE — 512

Fall Back To 4G Mode For Data Calls On The UE — 514

Start Back-Off Timer — 516

Back-Off Timer Expired? — 518    No

Yes

Enable 5G Data Calls On The UE In Response To Determining That The Back-Off Timer Has Expired — 520

FIG. 5

METHOD TO FAST RECOVER UE FROM PS CALL FAILURE IN 5G NSA

BACKGROUND

Long Term Evolution (LTE), Fifth Generation (5G) new radio (NR)(5G-NR), and other recently developed communication technologies allow user equipment to communicate information at data rates (e.g., in terms of Gigabits per second, etc.) that are orders of magnitude greater than what was available just a few years ago.

Today's communication networks are also more secure, resilient to multipath fading, allow for lower network traffic latencies, provide better communication efficiencies (e.g., in terms of bits per second per unit of bandwidth used, etc.). These and other recent improvements have facilitated the emergence of the Internet of Things (IOT), large scale Machine to Machine (M2M) communication systems, autonomous vehicles, and other technologies that rely on consistent and secure communications.

One implementation option for 5G networks being adopted is a 5G non-standalone (NSA) network in which a radio access network (RAN) providing both LTE and NR support (e.g., a RAN including both LTE base stations, such as LTE Evolved nodeBs (eNodeBs or eNBs), and NR base stations, such as Next Generation NodeB (gNodeBs or gNBs)) is connected to an LTE core network (e.g., an Evolved Packet Core (EPC) network). A user equipment (UE) in such 5G NSA networks that can support both LTE and NR communications can signal to the 5G NSA that the UE supports dual connectivity with new radio (DCNR). In such 5G NSA networks, a packet switched (PS) call failure on a UE indicating support for DCNR can sometimes be unrecoverable and can sometimes result in all subsequent PS service setup attempts failing, thereby preventing data traffic communications. Such PS call failure on a UE indicating support for DCNR can result in a negative user experience as data services, such as Internet access, etc., can be unavailable for a period of time.

SUMMARY

Various aspects include systems and methods for enabling fast recovery by a user equipment (UE) from packet switched (PS) call failure in a fifth generation (5G) non-standalone (NSA) network. Various aspects may be performed by a processor of a UE, such as a modem processor of a UE. Various aspects may include determining whether a total number of Evolved Packet System (EPS) bearer deactivation requests received from a base station of a 5G NSA network during a time period exceeds a maximum counter value, and disabling 5G data calls on the UE in response to determining that the total number of EPS bearer deactivation requests received from the base station of the 5G NSA network during the time period exceeds the maximum counter value. Some aspects may further include falling back to fourth generation (4G) for data calls in response to disabling 5G data calls on the UE. In some aspects, the time period may be sixty seconds and the maximum counter value may be five.

Various aspects may further include starting a back-off timer in response to disabling 5G data calls on the UE, determining whether the back-off timer has expired, and enabling 5G data calls on the UE in response to determining that the back-off timer has expired. In some aspects, the back-off timer may expire one hour after starting.

Various aspects may further include sending a first tracking area update request to the base station of the 5G NSA network prior to receiving any EPS bearer deactivation requests from the base station of the 5G NSA network, the first tracking area update request indicating dual connectivity with new radio (DCNR) is supported by the UE, and sending a second tracking area update request to the base station of the 5G NSA network in response to disabling 5G data calls on the UE, the second tracking area update request indicating DCNR is not supported.

Further aspects may include a user equipment having a processor configured to perform one or more operations of any of the methods summarized above. Further aspects may include a non-transitory processor-readable storage medium having stored thereon processor-executable instructions configured to cause a processor of a user equipment to perform operations of any of the methods summarized above. Further aspects include a user equipment having means for performing functions of any of the methods summarized above. Further aspects include a system-on-chip for use in a user equipment that includes a processor configured to perform one or more operations of any of the methods summarized above. Further aspects include a system in a package that includes two systems on chip for use in a user equipment that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

FIG. 2 is a component block diagram illustrating an example computing and wireless modem system suitable for implementing any of the various embodiments.

FIG. 3 is a component block diagram illustrating a software architecture including a radio protocol stack for the user and control planes in wireless communications suitable for implementing any of the various embodiments.

FIG. 5 is a process flow diagram illustrating a method for recovering from packet switched (PS) call failure in a fifth generation (5G) non-standalone (NSA) network in accordance with various embodiments.

DETAILED DESCRIPTION

Figure 1:
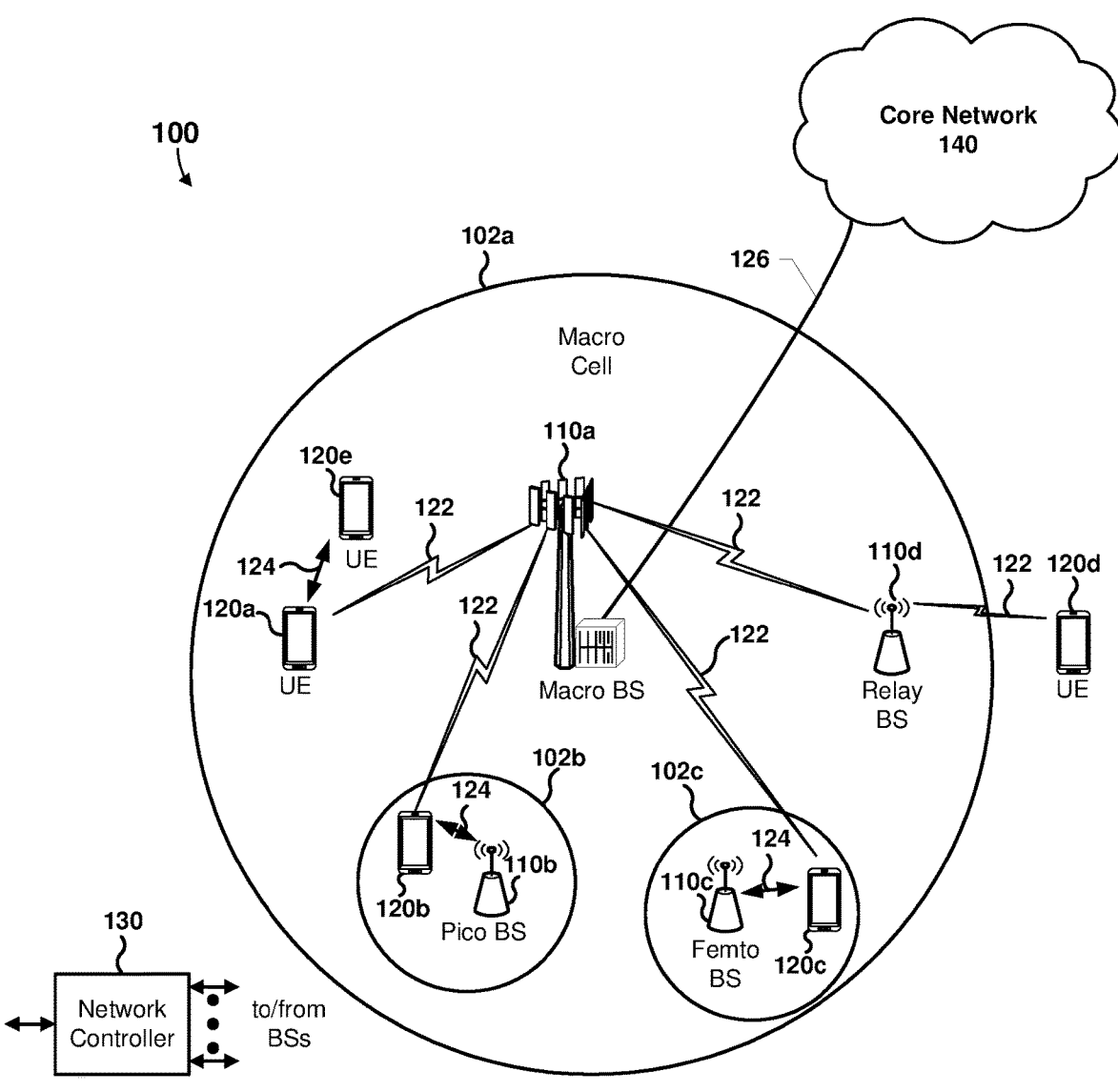
FIG. 1 is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include systems and methods for recovering from packet switched (PS) call failure in a fifth generation (5G) non-standalone (NSA) network. Various embodiments may disable 5G data calls on a user equipment (UE) in response to PS call failure. Disabling of 5G data calls may trigger fallback to fourth generation (4G) for data calls. Various embodiments may improve user experience by enabling recovery from PS call failure and thereby allowing data traffic communications between a UE and the NSA network. Various embodiments may improve user experience by making data services, such as Internet access, etc., available to a user after a PS call failure.

The term "user equipment" or "UE" is used herein to refer to personal wireless communication devices including any of cellular telephones, smartphones, portable computing devices, personal or mobile multi-media players, laptop computers, tablet computers, smartbooks, ultrabooks, palmtop computers, wireless electronic mail receivers, and multimedia Internet-enabled cellular telephones. Various embodiments may also be implemented on other forms of wireless devices, which may include wireless router devices, wireless appliances, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system-on-chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single user equipment. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a user equipment and/or subscription on a user equipment. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), IEEE 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards.

LTE is a mobile network standard for 4G wireless communication of high-speed data developed by the 3GPP (3rd Generation Partnership Project) and specified in its Release 8 document series. In contrast to the circuit-switched (CS) model of cellular network standards, LTE has been designed to support only packet switched (PS) services. Data services in LTE may be provided over the Internet, while multimedia services may be supported by the Internet Multimedia Subsystem (IMS) framework. The LTE standard is based on the evolution of the Universal Mobile Telecommunications System (UMTS) radio access through the Evolved Universal Terrestrial Radio Access Network (E-UTRAN). The E-UTRAN together with the Evolved Packet Core (EPC) network (core network accommodating LTE) make up an Evolved Packet System (EPS). While the access network in UMTS emulates a circuit-switched connection for real time services and a packet-switched connection for datacom services, the Evolved Packet System (EPS) is purely Internet Protocol (IP) based, and both real time services and datacom services are carried by the IP protocol.

The 5G system is an advanced technology from 4G LTE, and provides a new radio access technology (RAT) through the evolution of the existing mobile communication network structure. A 5G system may support, for example, extended LTE (eLTE) as well as non-3GPP access (e.g., WLAN).

One implementation option for 5G systems or networks currently being adopted is a 5G NSA network in which a radio access network (RAN) providing both LTE (also referred to as 4G) and NR (also referred to a 5G) support (e.g., a RAN including both LTE base stations, such as LTE Evolved nodeBs (eNodeBs or eNBs), and NR base stations, such as Next Generation NodeB (gNodeBs or gNBs)) is connected to an LTE core network (e.g., an Evolved Packet Core (EPC) network). A user equipment (UE) in such 5G NSA networks that can support both LTE and NR communications can signal to the 5G NSA that the UE supports dual connectivity with new radio (DCNR).

In 5G NSA networks, different data traffic may exist for different services. For example, conventional IP-oriented (i.e., "data-centric") applications (e.g. web-browsers, games, e-mail applications, etc.), may be provided in an LTE and/or 5G system as data services over the public Internet. Real-time communication services (e.g., voice calls, Short Message Service (SMS) communications, etc.) may be provided in an LTE and/or 5G system as IMS services. The IMS architecture allows operators to offer carrier grade services to be offered on packet-switched networks. Examples of services that have been standardized on top of IMS include Open Mobile Alliance (OMA) presence and group list management, Push-to-Talk over Cellular (PoC), Instant Messaging, and TISPAN/3GPP multimedia telephony for IMS (MMTel). Other IMS services that have been developed for deployment as next-generation LTE services include Voice over LTE (VoLTE) and Video Telephony (VT). Thus, although LTE and 5G data is IP-based, the multiple data types/services may be accessed through different packet data networks (PDN) in the 5G NSA network.

In current 5G NSA networks, a PS call failure on a UE indicating support for DCNR can sometimes be unrecoverable resulting in all subsequent PS service setup attempts failing, thereby preventing data traffic communications (also referred to as data-centric services). Such PS call failures on a UE indicating support for DCNR can result in a negative user experience as data services, such as Internet access, can be unavailable for a period of time.

For example, in some current 5G NSA networks, a 5G capable UE may register with the NSA network and initially indicate the UE has a 5G data capability. Some UE can by default operate in 5G for data calls on the UE. As specific example, the UE may send an attach request (ATTACH_REQ)/tracking area update request (TRACK-ING_AREA_UPDATE_REQ) indicating DCNR is supported by the UE. For example, a DCNR support flag bit may be set (e.g., DCNR=1) in the attach request/tracking area update request sent to a base station of the 5G NSA network, such as an LTE cell (e.g., an eNB). The base station of the 5G NSA network, such as an LTE cell (e.g., an eNB) may return an attachment acceptance (ATTACH_ACCEPT)/ tracking area update acceptance (TRACKING_AREA_UP-DATE_ACCEPT) to the UE.

In some current 5G NSA networks, the UE may send a service request for data traffic (e.g., data traffic associated with an Internet browser, social media application, etc.) to the base station of the 5G NSA network, such as an LTE cell (e.g., an eNB), after attaching to the base station and indicating DCNR support. In this manner, the UE can establish a data call (i.e., a PS call) with the base station of the 5G NSA network, such as an LTE cell (e.g., an eNB), to send/receive the data traffic.

In some current 5G NSA networks, following the data service request by the UE indicating DCNR is supported, the base station of the 5G NSA network, such as an LTE cell (e.g., an eNB), can deactivate an EPS bearer, thereby causing the data call (i.e., the PS call) to terminate. For example, the base station of the 5G NSA network, such as an LTE cell (e.g., an eNB), may send an EPS bearer deactivation request (e.g., a deactivate EPS bearer context request number thirty-six indicating regular deactivation by the network) and the UE may respond accepting the EPS bearer deactivation request (e.g., by sending a deactivate EPS bearer context accept). The EPS bearer may be deactivated on the UE, thereby causing the data call (i.e., the PS call) to terminate.

In some current 5G NSA networks, in response to an EPS bearer deactivation and data call termination, the UE may reattempt to establish a data call (i.e., a PS call) with the base station of the 5G NSA network, such as an LTE cell (e.g., an eNB). For example, the UE may send further service requests to the base station of the 5G NSA network, such as an LTE cell (e.g., an eNB). In some current 5G NSA networks, the base station of the 5G NSA network, such as an LTE cell (e.g., an eNB) may send EPS bearer deactivation requests following each further service request by the UE, thereby causing each PS call service request by the UE to fail and the UE to be unable to recover from the initial PS call failure. This repeated failure of the UE to establish a PS call, and resulting repeated failure to support data traffic, causes a degraded user experience as users are unable to access the Internet, often for a long period of time.

Various embodiments enable fast recovery by a UE from PS call failure in a 5G NSA network. Various embodiments may provide an automatic recovery mechanism that may support 5G capable UEs to establish data calls using 4G fallback (i.e., establishing a wireless communication link with a 4G network) in response to EPS bearer deactivation by a base station of the 5G NSA network, such as an LTE cell (e.g., an eNB).

In various embodiments, a processor of a UE (e.g., an application processor (AP), modem processor, etc.) may maintain a counter to record the number of EPS bearer deactivation requests received from a 5G NSA network. The counter reaching a maximum counter value may indicate that the 5G NSA network is operating abnormally and PS call failure may be occurring. In some embodiments, the counter may track the total number of EPS bearer deactivation requests received during a time period. As one example, the time period may be sixty seconds and the maximum counter value may be five EPS bearer deactivation requests. In some embodiments, as EPS bearer deactivation requests are received, indications of the EPS bearer requests may be stored. The indications of the EPS bearer deactivation requests may include timestamps of when the EPS bearer deactivation requests were received. The time period, such as sixty seconds, may extend backward from the most recent received EPS bearer deactivation request. The counter may track the number of EPS bearer deactivation request indications having timestamps falling in the time window corresponding to the time period, such as the total number of EPS bearer deactivation requests received in the sixty seconds prior to the most recent EPS bearer deactivation request. In some embodiments, a counter and timer combination may be used to track the total number of EPS bearer deactivation requests received in a time period. For example, the counter may track a total number of EPS bearer deactivation requests received from a base station of the 5G NSA network, such as an LTE cell (e.g., an eNB), during a time period tracked by the timer, and the counter may be reset at each expiration of the timer.

In various embodiments, in response to determining that the total number of EPS bearer deactivation requests received from the base station of the 5G NSA network, such as an LTE cell (e.g., an eNB), during the time period exceeds the maximum counter value, a processor of a UE (e.g., AP, modem processor, etc.) may disable 5G data calls on the UE. In various embodiments, disabling the 5G data calls may result in the UE falling back to 4G mode by connecting to a 4G network for data calls.

In various embodiments, in response to disabling 5G data calls on the UE, a processor of a UE (e.g., an AP, modem processor, etc.) may send a tracking area update request to the base station of the 5G NSA network, such as an LTE cell (e.g., an eNB), indicating DCNR is not supported by the UE.

For example, a DCNR support flag bit may be unset (e.g., DCNR=0) in the tracking area update request sent to the base station of the 5G NSA network, such as an LTE cell (e.g., an eNB), in response to disabling 5G data calls on the UE. The base station of the 5G NSA network, such as an LTE cell (e.g., an eNB), may return a tracking area update acceptance to the UE. The UE may send a service request for data traffic (e.g., data traffic associated with an Internet browser, social media application, etc.) to the base station of the 5G NSA network, such as an LTE cell (e.g., an eNB), and the EPS bearer may be activated in 4G mode. The activation of the EPS bearer in 4G mode may support the PS call between the UE and the base station of the 5G NSA network, such as an LTE cell (e.g., an eNB) and the sending/receiving of data traffic. As a PS call between the UE and the base station of the 5G NSA network, such as an LTE cell (e.g., an eNB) may be successfully established in 4G mode, rather than previously unsuccessfully attempted in 5G mode, the UE may be considered to have recovered from PS call failure (e.g., the 5G mode PS call failure). The user may be able to access the Internet in 4G mode, improving the user experience in comparison to repeated 5G mode failures.

In some embodiments, in response to disabling 5G data calls on the UE, a processor of a UE (e.g., an AP, modem processor, etc.) may start a back-off timer. The back-off timer may be a timer configured to ensure 5G data calls remain disabled on the UE for a selected period of time. As an example, the back-off timer may be a countdown timer configured to expire one hour after starting. 5G data calls may remain disabled on the UE until the back-off timer expires. In response to determining that the back-off timer has expired, a processor of a UE (e.g., an AP, modem processor, etc.) may enable 5G data calls on the UE. For example, a DCNR support flag bit may be set (e.g., DCNR=1) in a tracking area update request sent to the base station of the 5G NSA network, such as an LTE cell (e.g., an eNB), in response to enabling 5G data calls on the UE when the back-off timer has expired. Sending the tracking area update request with the DCNR support flag bit set (e.g., DCNR=1) may enable the UE to reestablish 5G data service.

FIG. 1 is a system block diagram illustrating an example communication system 100 suitable for implementing any of the various embodiments. The communications system 100 may be a 5G New Radio (NR) network, or any other suitable network such as an LTE network, 5G NSA network, etc.

The communications system 100 may include a heterogeneous network architecture that includes a core network 140 and a variety of mobile devices (illustrated as user equipment (UE) 120a-120e in FIG. 1). The communications system 100 may also include a number of base stations (illustrated as the BS 110a, the BS 110b, the BS 110c, and the BS 110d) and other network entities. A base station is an entity that communicates with user equipments, and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station Subsystem serving this coverage area, or a combination thereof, depending on the context in which the term is used. The core network 140 may be any type core network, such as an LTE core network (e.g., an EPC network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The user equipment (UE) 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and transmit the data to a downstream station (for example, a user equipment (UE) or a base station). A relay station also may be a mobile device that can relay transmissions for other user equipments. In the example illustrated in FIG. 1, a relay station 110d may communicate with macro the base station 110a and the user equipment 120d in order to facilitate communication between the base station 110a and the user equipment 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The user equipments (UEs) 120a, 120b, 120c may be dispersed throughout communications system 100, and each user equipment may be stationary or mobile. A user equipment also may be referred to as an access terminal, a terminal, a mobile station, a subscriber unit, a station, user equipment (UE), etc.

A macro base station 110a may communicate with the communication network 140 over a wired or wireless communication link 126. The user equipments (UEs) 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more Radio access technologies (RATs). Examples of RATs that may be used in a wireless communication link include 3GPP LTE, 3G, 4G, 5G (e.g., NR), GSM, CDMA, WCDMA, Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum Resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 Resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new Radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR Resource blocks may span 12 sub-carriers with a subcarrier bandwidth of 75 kHz over a 0.1 millisecond (ms) duration. Each Radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per user equipment. Multi-layer transmissions with up to 2 streams per user equipment may be supported. Aggregation of multiple cells may be supported with up to eight serving cells. Alternatively, NR may support a different air interface, other than an OFDM-based air interface.

Some mobile devices may be considered machine-type communication (MTC) or Evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A user equipment (UE) 120a-e may be included inside a housing that houses components of the user equipment, such as processor components, memory components, similar components, or a combination thereof.

In general, any number of communication systems and any number of wireless networks may be deployed in a given geographic area. Each communications system and wireless network may support a particular Radio access technology (RAT) and may operate on one or more frequencies. A RAT also may be referred to as a Radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G NSA network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an EPC network) in a 5G NSA network.

In some embodiments, two or more user equipments 120a-e (for example, illustrated as the user equipment 120a and the user equipment 120e) may communicate directly using one or more sidelink channels 124 (for example, without using a base station 110a-110d as an intermediary to communicate with one another). For example, user equipment 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the user equipment 120a-e may perform scheduling operations, resource selection operations, as well as other operations described elsewhere herein as being performed by the base station 110*a*

Figure 2:
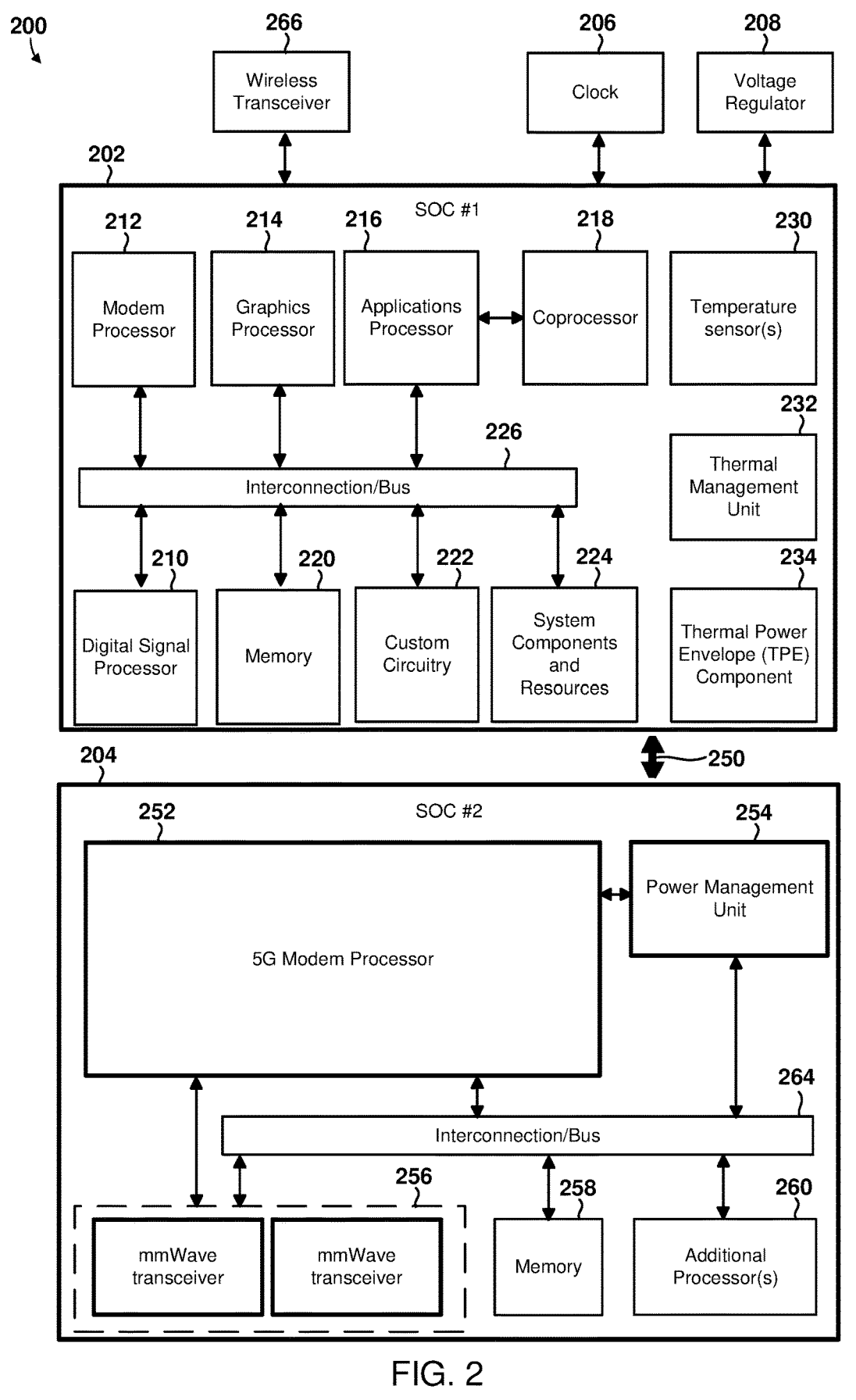

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example user equipment 200 (which may be a SIP in some embodiments) includes a two SOCs 202, 204 coupled to a clock 206, a voltage regulator 208, and a wireless transceiver 266 configured to send and receive wireless communications via an antenna (not shown) to/from network wireless devices, such as a base station 110*a*. In some embodiments, the first SOC 202 operate as central processing unit (CPU) of the user equipment that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a user equipment. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
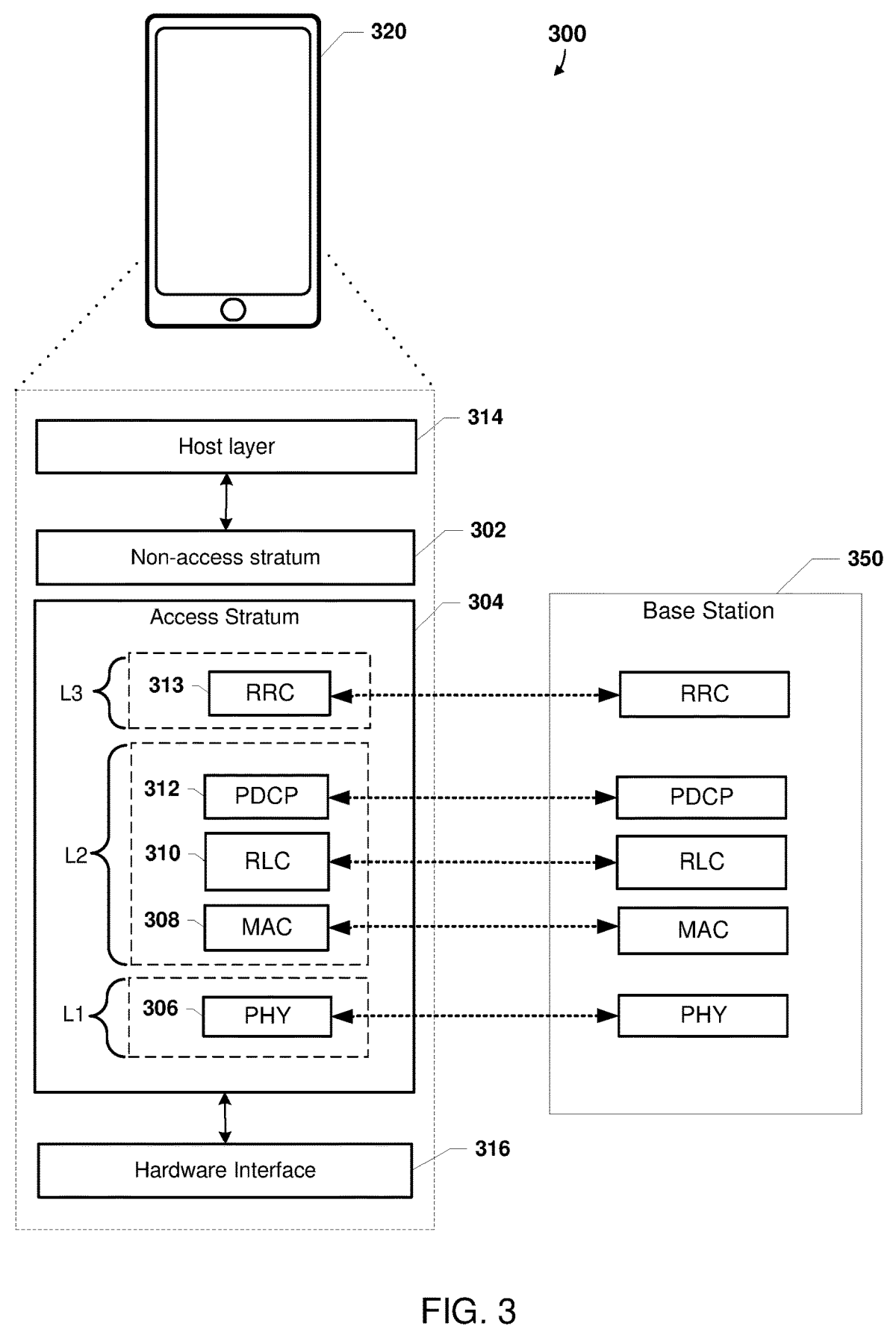

FIG. 3 is a component block diagram illustrating a software architecture 300 including a radio protocol stack for the user and control planes in wireless communications suitable for implementing any of the various embodiments. With reference to FIGS. 1-3, the user equipment 320 may implement the software architecture 300 to facilitate communication between a user equipment (UE) 320 (e.g., the user equipment (UE) 120*a*-120*e*, 200) and the base station 350 (e.g., the base station 110*a*) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) user equipment, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support Packet filtering, security management, mobility control, session management, and traffic and signaling between a SIM(s) of the user equipment and its core network 140. The AS 304 may include functions and protocols that support communication between a SIM(s) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the user equipment 320 and the base station 350 over the physical layer 306. In the various embodiments, Layer 2 may include a Media Access Control (MAC) sublayer 308, a Radio link Control (RLC) sublayer 310, and a Packet data convergence protocol (PDCP) 312 sublayer, each of which form logical connections terminating at the base station 350.

In the control plane, Layer 3 (L3) of the AS 304 may include a Radio Resource Control (RRC) sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the user equipment 320 and the base station 350.

In various embodiments, the PDCP sublayer 312 may provide uplink functions including multiplexing between different Radio bearers and logical channels, sequence number addition, handover data handling, integrity protection, ciphering, and header compression. In the downlink, the PDCP sublayer 312 may provide functions that include in-sequence delivery of data packets, duplicate data Packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the user equipment 320. In some embodiments, application-specific functions provided by the at least one host layer 314 may provide an interface between the software architecture and the general purpose processor.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a PDN gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
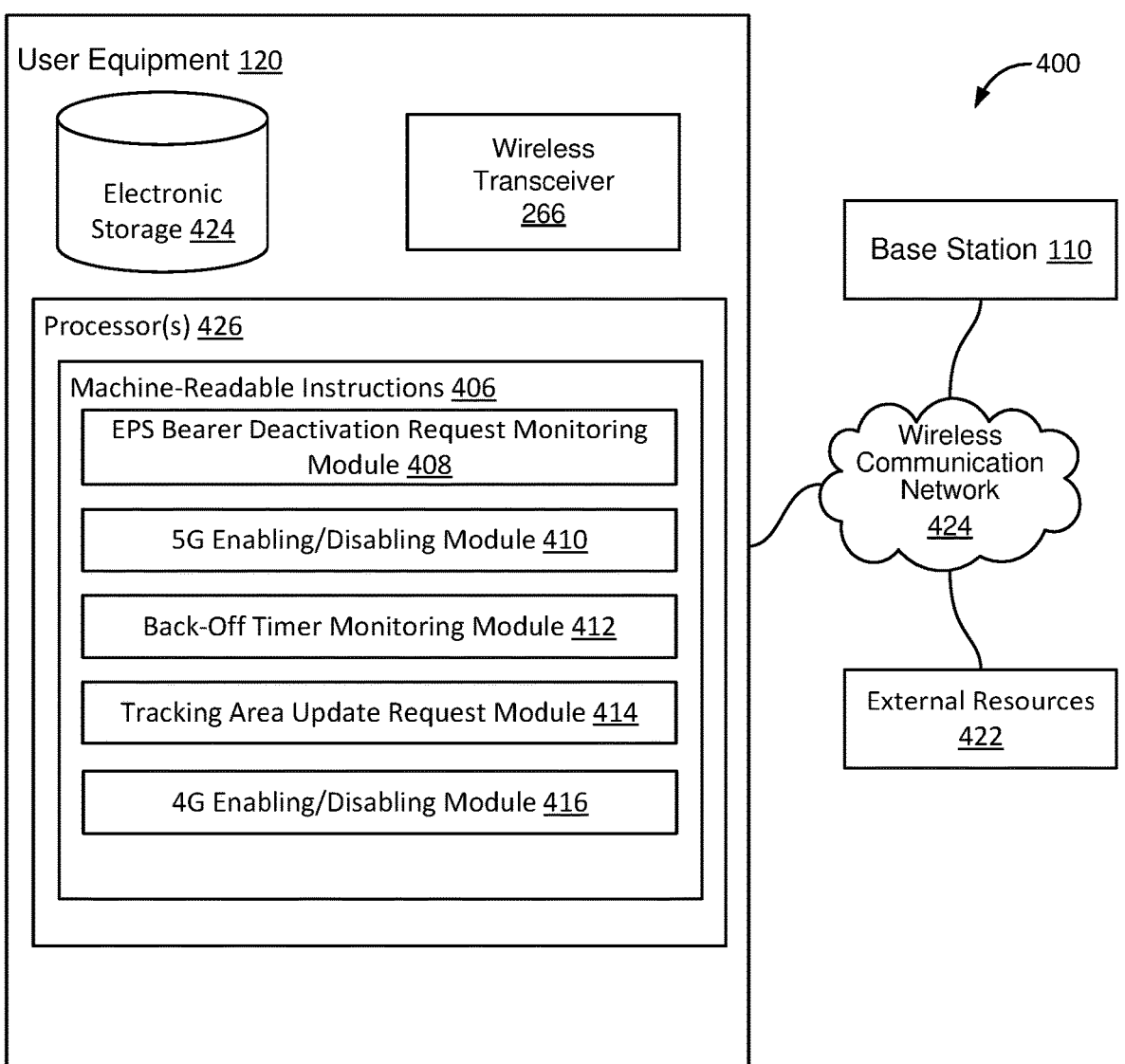
FIG. 4 is a component block diagram illustrating a system configured for wireless communication in accordance with various embodiments.

FIG. 4 is a component block diagram illustrating a communication system 400 configured for wireless communication in accordance with various embodiments. With reference to FIGS. 1-4, the communication system 400 may include a user equipment (UEs) 120 and one or more base stations 110 forming a wireless communication network 424, which may provide connections to external resources 422. External resources 422 may include sources of information outside of system 400, external entities participating with the system 400, and/or other resources.

A user equipment 120 may be configured by machine-readable instructions 406. Machine-readable instructions 406 may include one or more instruction modules. The instruction modules may include computer program modules. The instruction modules may include one or more of EPS bearer deactivation request monitoring module 408, 5G enabling/disabling module 410, back-off timer monitoring module 412, tracking area update request module 414, 4G enabling/disabling module 416, and/or other instruction modules.

The EPS bearer deactivation request monitoring module 408 may be configured to maintain a counter to record the number of EPS bearer deactivation requests received from a 5G NSA network. The EPS bearer deactivation request monitoring module 408 may be configured to determine whether a total number of EPS bearer deactivation requests received from a base station of a 5G NSA network, such as an LTE cell (e.g., an eNB), during a time period exceeds a maximum counter value. As one example, the time period may be sixty seconds and the maximum counter value may be five. The EPS bearer deactivation request monitoring module 408 may be configured to determine whether an EPS bearer deactivation request is received from a base station of a 5G NSA network, such as an LTE cell (e.g., an eNB). The EPS bearer deactivation request monitoring module 408 may be configured to store indications of EPS bearer deactivation requests in a memory (e.g., electronic storage 424). The EPS bearer deactivation request monitoring module 408 may be configured to include timestamps with the indications of the EPS bearer deactivation requests, such as timestamps of when the EPS bearer deactivation requests were received by the user equipment (UE) 120a-120e. The EPS bearer deactivation request monitoring module 408 may be configured to track the number of EPS bearer deactivation request indications having timestamps falling in the time window corresponding to the time period, such as the total number of EPS bearer deactivation requests received in the sixty seconds prior to the most recent EPS bearer deactivation request. The EPS bearer deactivation request monitoring module 408 may be configured to operate as a counter and timer combination to track the total number of EPS bearer deactivation requests received in a time period. For example, the EPS bearer deactivation request monitoring module 408 may track a total number of EPS bearer deactivation requests received from a base station of the 5G NSA network, such as an LTE cell (e.g., an eNB), during a time period tracked by the timer, and the counter may be reset at each expiration of the timer. The EPS bearer deactivation request monitoring module 408 may be configured to indicate to the 5G enabling/disabling module 410 that the total number of EPS bearer deactivation requests received from the base station of the 5G NSA network, such as an LTE cell (e.g., an eNB), during the time period exceeds the maximum counter value.

The 5G enabling/disabling module 410 may be configured to disable and/or enable 5G data calls on the UE. The 5G enabling/disabling module 410 may be configured to receive an indication that a total number of EPS bearer deactivation requests received from the base station of the 5G NSA network, such as an LTE cell (e.g., an eNB), during a time period exceeds the maximum counter value from the EPS bearer deactivation request monitoring module 408. The 5G enabling/disabling module 410 may be configured to disable the 5G data calls on the UE in response to determining that the total number of EPS bearer deactivation requests received from the base station of the 5G NSA network during the time period exceeds the maximum counter. The 5G enabling/disabling module 410 may be configured to signal to the tracking area update request module 414 that 5G data calls are enabled on the UE and/or that 5G data calls are disabled on the UE. The 5G enabling/disabling module 410 may be configured to signal to the back-off timer monitoring module 412 that 5G data calls are disabled on the UE. The 5G enabling/disabling module 410 may be configured to receive an indication from the back-off timer monitoring module 412 that a back-off timer has expired. The 5G enabling/disabling module 410 may be configured to enable 5G data calls on the UE in response to determining that the back-off timer has expired. The 5G enabling/disabling module 410 may be configured to signal to the 4G enabling/disabling module 416 that 5G data calls are enabled on the UE and/or that 5G data calls are disabled on the UE.

The back-off timer module 412 may be configured to receive an indication from the 5G enabling/disabling module 410 that 5G data calls are disabled on the UE. The back-off timer monitoring module 412 may be configured to start a back-off timer in response to disabling 5G data calls on the UE. The back-off timer monitoring module 412 may be configured to determine whether the back-off timer has expired. The back-off timer monitoring module 412 may be configured to send an indication that the back-off timer has expired to the 5G enabling/disabling module 410 in response to determining that the back-off timer has expired.

The tracking area update request module 414 may be configured to send tracking area update requests to the base station of the 5G NSA network, such as an LTE cell (e.g., an eNB). The tracking area update request module 414 may be configured to indicate DCNR is supported by the UE in the tracking area update requests and/or that DCNR is not supported by the UE in the tracking area update requests. For example, the tracking area update request module 414 may be configured to set (e.g., DCNR=1) or unset (e.g., DCNR=0) flag bits indicating DCNR support (or lack thereof) by the UE in tracking area update requests. The tracking area update request module 414 may be configured to receive an indication that 5G data calls are enabled on the UE and/or that 5G data calls are disabled on the UE from the 5G enabling/disabling module 410. The tracking area update request module 414 may be configured to receive an indication that 4G data calls are enabled on the UE and/or that 4G data calls are disabled on the UE from the 4G enabling/disabling module 416.

The 4G enabling/disabling module 416 may be configured to disable and/or enable 4G data calls on the UE. The 4G enabling/disabling module 416 may be configured to receive an indication from the 5G enabling/disabling module 410 that 5G data calls are enabled on the UE and/or that 5G data calls are disabled on the UE. The 4G enabling/disabling module 416 may be configured to fall back to 4G for data calls in response to disabling 5G data calls on the UE. The 4G enabling/disabling module 416 may be configured to send an indication that 4G data calls are enabled on the UE and/or that 4G data calls are disabled on the UE to the tracking area update request module 414.

The user equipment 120, remote platform(s) 110, and/or external resources 422 may be operatively linked via one or more electronic communication links of the wireless communication network. For example, the wireless communication network may establish links via a network such as the Internet and/or other networks.

The user equipment 120 may include electronic storage 424, one or more processors 426 (e.g., an AP processor 216, modem processor 212, 252, etc.), one or more wireless transceivers 266, and/or other components. The user equipment 120a-120e may include communication lines, or ports to enable the exchange of information with a network and/or other user equipment. The illustration of the user equipment 120 is not intended to be limiting. The user equipment 120 may include a plurality of hardware, software, and/or firmware components operating together to provide the functionality attributed herein to user equipment 120.

Electronic storage 424 may include non-transitory storage media that electronically stores information. The electronic storage media of electronic storage 424 may include one or both of system storage that is provided integrally (i.e., substantially non-removable) with the user equipment 120 and/or removable storage that is removably connectable to the user equipment 120 via, for example, a port (e.g., a universal serial bus (USB) port, a firewire port, etc.) or a drive (e.g., a disk drive, etc.). Electronic storage 424 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 424 may include one or more virtual storage resources (e.g., cloud storage, a virtual private network, and/or other virtual storage resources). Electronic storage 424 may store software algorithms, information determined by processor(s) 426, information received from the user equipment 120, information received from remote platform(s) 110, and/or other information that enables the user equipment 120 to function as described herein.

The processor(s) 426 may be configured to provide information processing capabilities in the user equipment 120. As such, the processor(s) 426 may include one or more of a digital processor, an analog processor, a digital circuit designed to process information, an analog circuit designed to process information, a state machine, and/or other mechanisms for electronically processing information. Although the processor(s) 426 is illustrated as a single entity, this is for illustrative purposes only. In some embodiments, the processor(s) 426 may include a plurality of processing units and/or processor cores. The processing units may be physically located within the same device, or processor(s) 426 may represent processing functionality of a plurality of devices operating in coordination. The processor(s) 426 may be configured to execute modules 408, 410, 412, 414, and/or 416 and/or other modules by software; hardware; firmware; some combination of software, hardware, and/or firmware; and/or other mechanisms for configuring processing capabilities on processor(s) 426. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 408, 410, 412, 414, and/or 416 are illustrated as being implemented within a single processing unit, in embodiments in which the processor(s) 426 includes multiple processing units and/or processor cores, one or more of modules 408, 410, 412, 414, and/or 416 may be implemented remotely from the other modules. The description of the functionality provided by the different modules 408, 410, 412, 414, and/or 416 described below is for illustrative purposes, and is not intended to be limiting, as any of modules 408, 410, 412, 414, and/or 416 may provide more or less functionality than is described. For example, one or more of the modules 408, 410, 412, 414, and/or 416 may be eliminated, and some or all of its functionality may be provided by other modules 408, 410, 412, 414, and/or 416. As another example, the processor(s) 426 may be configured to execute one or more additional modules that may perform some or all of the functionality attributed below to one of the modules 408, 410, 412, 414, and/or 416.

FIG. 5 is a process flow diagram illustrating a method 500 that may be performed by a processor of a user equipment for recovering from PS call failure in a 5G NSA network. With reference to FIGS. 1-5, the method 500 may be implemented by one or more processors (e.g., 210, 212, 214, 216, 218, 252, 260, 426) of a UE (e.g., 120, 120a-120e, 200, 320).

In block 502, the processor may send a tracking area update request to a base station of a 5G NSA network, the tracking area update request indicating DCNR is supported by the UE. For example, a DCNR support flag bit may be set (e.g., DCNR=1) in a tracking area update request sent to the base station of the 5G NSA network, such as an LTE cell (e.g., an eNB). DCNR support may be a default setting for 5G enabled UEs in 5G NSAs. Indicating DCNR is supported by the UE in the tracking area update request may enable the UE to attempt to establish 5G data calls (PS calls) in the 5G NSA network.

In determination block 504, the processor may determine whether an EPS bearer deactivation request is received from the base station of the 5G NSA network. The base station of the 5G NSA network, such as an LTE cell (e.g., an eNB), can deactivate an EPS bearer, thereby causing the data call (i.e., the PS call) to terminate. For example, the base station of the 5G NSA network, such as an LTE cell (e.g., an eNB), may send an EPS bearer deactivation request (e.g., a deactivate EPS bearer context request number thirty-six indicating regular deactivation by the network) to the UE.

In response to determining that an EPS bearer deactivation request is not received (i.e., determination block 504="No"), the processor may await an EPS bearer deactivation request and continue to determine whether an EPS bearer deactivation request is received from the base station of the 5G NSA network in determination block 504.

In response to determining that an EPS bearer deactivation request is received (i.e., determination block 504="Yes"), the processor may store an indication of the EPS bearer deactivation request in block 506. In some embodiments, as EPS bearer deactivation requests are received, indications of the EPS bearer requests may be stored. The indications of the EPS bearer deactivation requests may include timestamps of when the EPS bearer deactivation requests were received.

In determination block 508, the processor may determine whether a total number of EPS bearer deactivation requests received from a base station of a 5G NSA network during a time period exceeds a maximum counter value. As an example, the time period may be sixty seconds and the maximum counter value may be five EPS bearer deactivation requests. The time period, such as sixty seconds, may extend backward from the most recent received EPS bearer deactivation request. The processor may implement a counter to track the number of EPS bearer deactivation request indications having timestamps falling in the time window corresponding to the time period, such as the total number of EPS bearer deactivation requests received in the sixty seconds prior to the most recent EPS bearer deactivation request. A number of EPS bearer deactivation request indications having timestamps in the time window (i.e., during the time period tracked by the timer) may be compared to the maximum counter value to determine whether a total number of EPS bearer deactivation requests received from a base station of a 5G NSA network during a time period exceeds a maximum counter value.

In some embodiments, a counter and timer combination may be used to track the total number of EPS bearer deactivation requests received in a time period and the operations of block 506 may be optional. For example, the counter may track a total number of EPS bearer deactivation requests received from a base station of the 5G NSA network, such as an LTE cell (e.g., an eNB), during a time period tracked by the timer, and the counter may be reset at each expiration of the timer. In such embodiments, the processor may compare the counter value to the maximum counter value to determine whether a total number of EPS bearer deactivation requests received from a base station of a 5G NSA network during a time period exceeds a maximum counter value.

In response to determining that the total number of EPS bearer deactivation requests received from the base station of the 5G NSA network during the time period does not exceed the maximum counter value (i.e., determination block 508="No"), the processor may await an EPS bearer deactivation request and continue to determine whether an EPS bearer deactivation request is received from the base station of the 5G NSA network in determination block 504.

In response to determining that the total number of EPS bearer deactivation requests received from the base station of the 5G NSA network during the time period exceeds the maximum counter value (i.e., determination block 508="Yes"), the processor may disable 5G data calls on the UE in block 510. For example, the processor may change a DCNR status from DCNR supported to DCNR not supported to disable 5G data calls.

In block 512, the processor may send a tracking area update request to the base station of the 5G NSA network, the tracking area update request indicating DCNR is not supported. In this manner, the processor may cause the tracking area update request to be sent to the base station of the 5G NSA network in response to disabling 5G data calls on the UE. In response to disabling 5G data calls on the UE, a processor of a UE (e.g., an AP, modem processor, etc.) may send a tracking area update request to the base station of the 5G NSA network, such as an LTE cell (e.g., an eNB), indicating DCNR is not supported by the UE. For example, a DCNR support flag bit may be unset (e.g., DCNR=0) in the tracking area update request sent to the base station of the 5G NSA network, such as an LTE cell (e.g., an eNB), in response to disabling 5G data calls on the UE.

In block 514, the processor may fall back to 4G mode for data calls on the UE. For example, the processor may scan for and then camp on a 4G wireless network. Thus, the processor may cause the fallback to 4G for data calls on the UE in response to disabling 5G data calls on the UE. The fallback to 4G mode for data calls may result in service requests for data traffic (e.g., data traffic associated with an Internet browser, social media application, etc.) to be issued as 4G mode service requests and the EPS bearer may be activated in 4G mode. The activation of the EPS bearer in 4G mode may support the PS call between the UE and the base station of the 5G NSA network, such as an LTE cell (e.g., an eNB) and the sending/receiving of data traffic. As a PS call between the UE and the base station of the 5G NSA network, such as an LTE cell (e.g., an eNB) may be successfully established in 4G mode, rather than previously unsuccessfully attempted in 5G mode, the UE may be considered to have recovered from PS call failure (e.g., the 5G mode PS call failure). The user may be able to access the Internet in 4G mode, improving the user experience in comparison to repeated 5G mode failures.

In block 516, the processor may start a back-off timer in response to disabling 5G data calls on the UE. The back-off timer may be a timer configured to ensure 5G data calls remain disabled on the UE for a selected period of time while permitting the UE to switch back to a 5G network for other service. As one example, the back-off timer may be a countdown timer configured to expire one hour after starting.

In determination block 518, the processor may determine whether the back-off timer has expired.

In response to determining that the back-off timer has not expired (i.e., determination block 518="No"), the processor may continue to await the expiration of the back-off timer and determine whether the back-off timer has expired in determination block 518. 5G data calls may remain disabled on the UE while the back-off timer has not expired.

In response to determining that the back-off timer has expired (i.e., determination block 518="Yes"), the processor may enable 5G data calls on the UE in block 520. For example, the processor may change a DCNR status from DCNR not supported to DCNR supported to enable 5G data calls.

In response to enable 5G data calls on the UE, the processor may send a tracking update request to a base station of a 5G NSA network, the tracking area update request indicating DCNR is supported by the UE, in block 502. For example, a DCNR support flag bit may be set (e.g., DCNR=1) in a tracking area update request sent to the base station of the 5G NSA network, such as an LTE cell (e.g., an eNB). The sending of a tracking area update request with the DCNR support flag bit set (e.g., DCNR=1) may enable the UE to reestablish 5G data service.

Figure 6:
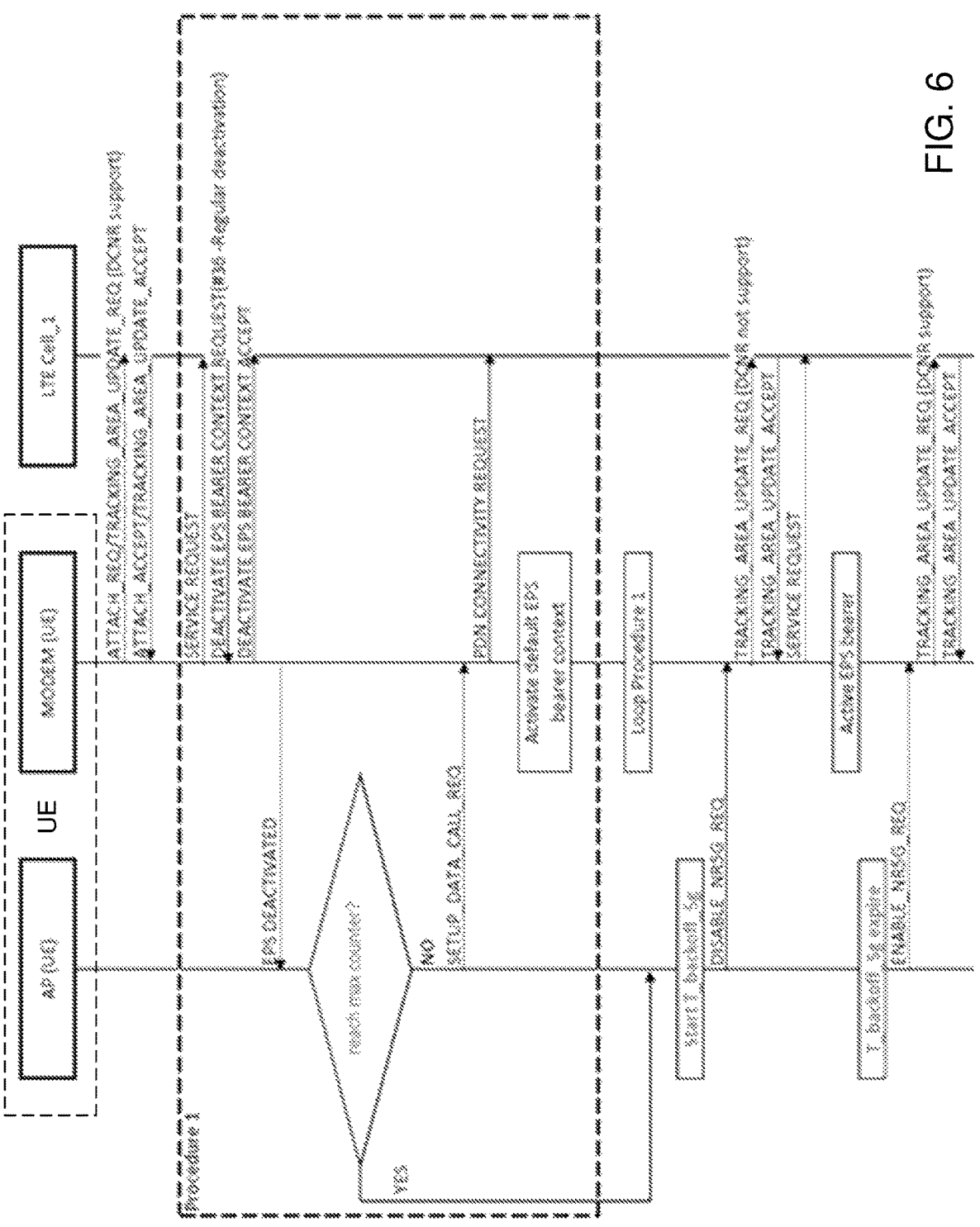
FIG. 6 is a call flow diagram illustrating example interactions between a user equipment and a base station of a 5G NSA network in accordance with various embodiments.

FIG. 6 is a call flow diagram illustrating example interactions between one or more processors (such as 210, 212, 214, 216, 218, 252, 260, 426) of a UE (such as the user equipment 120a-120e, 200, 320, 120a-120e) and a base station (e.g., base station 110a, 350, 110) of a 5G NSA network (e.g., network 100) accordance with various embodiments. With reference to FIGS. 1-6, the interactions illustrated in FIG. 6 may reflect example implementations of the various embodiment methods for recovering from PS call failure in a 5G NSA network, such as one or more operations of method 500. FIG. 6 illustrates an example implementation in which some operations are performed by an AP processor of the UE and some operations are performed by a modem processor of the UE while the UE is communicating with an LTE cell of the 5G NSA network (labeled LTE Cell_1 in FIG. 6). FIG. 6 illustrates that in response to determining a max counter for EPS bearer deactivation requests being reached, the AP processor may start a back-off timer for 5G and disable 5G data calls. FIG. 6 further illustrates that upon expiration of the back-off timer, the AP processor may enable 5G data calls.

Figure 7:
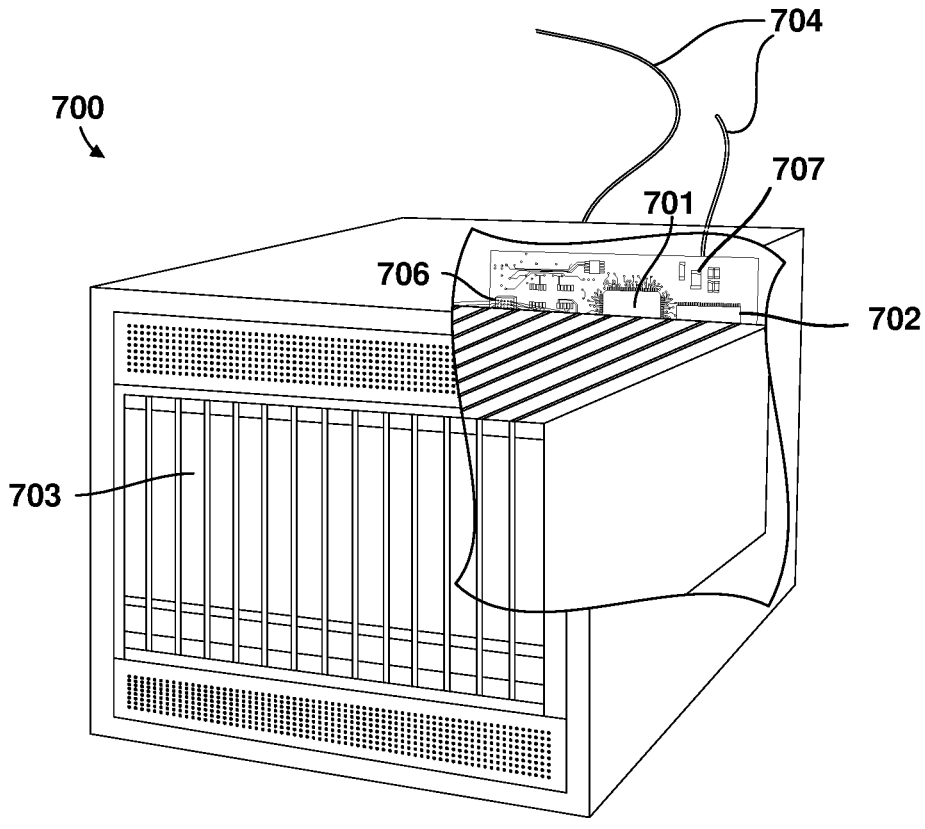
FIG. 7 is a component block diagram of a network computing device suitable for use with various embodiments.

FIG. 7 is a component block diagram of a network computing device 700 suitable for use with various embodiments. Such network computing devices may include at least the components illustrated in FIG. 7. With reference to FIGS. 1-7, the network computing device 700 may include a processor 701 coupled to volatile memory 702 and a large capacity nonvolatile memory, such as a disk drive 703. The network computing device 700 may also include a peripheral memory access device such as a floppy disc drive, compact disc (CD) or digital video disc (DVD) drive 706 coupled to the processor 701. The network computing device 700 may also include network access ports 704 (or interfaces) coupled to the processor 701 for establishing data connections with a network, such as the Internet and/or a local area network coupled to other system computers and servers. The network computing device 700 may include one or more antennas 707 for sending and receiving electromagnetic radiation that may be connected to a wireless communication link. The network computing device 700 may include additional access ports, such as USB, Firewire, Thunderbolt, and the like for coupling to peripherals, external memory, or other devices.

Figure 8:
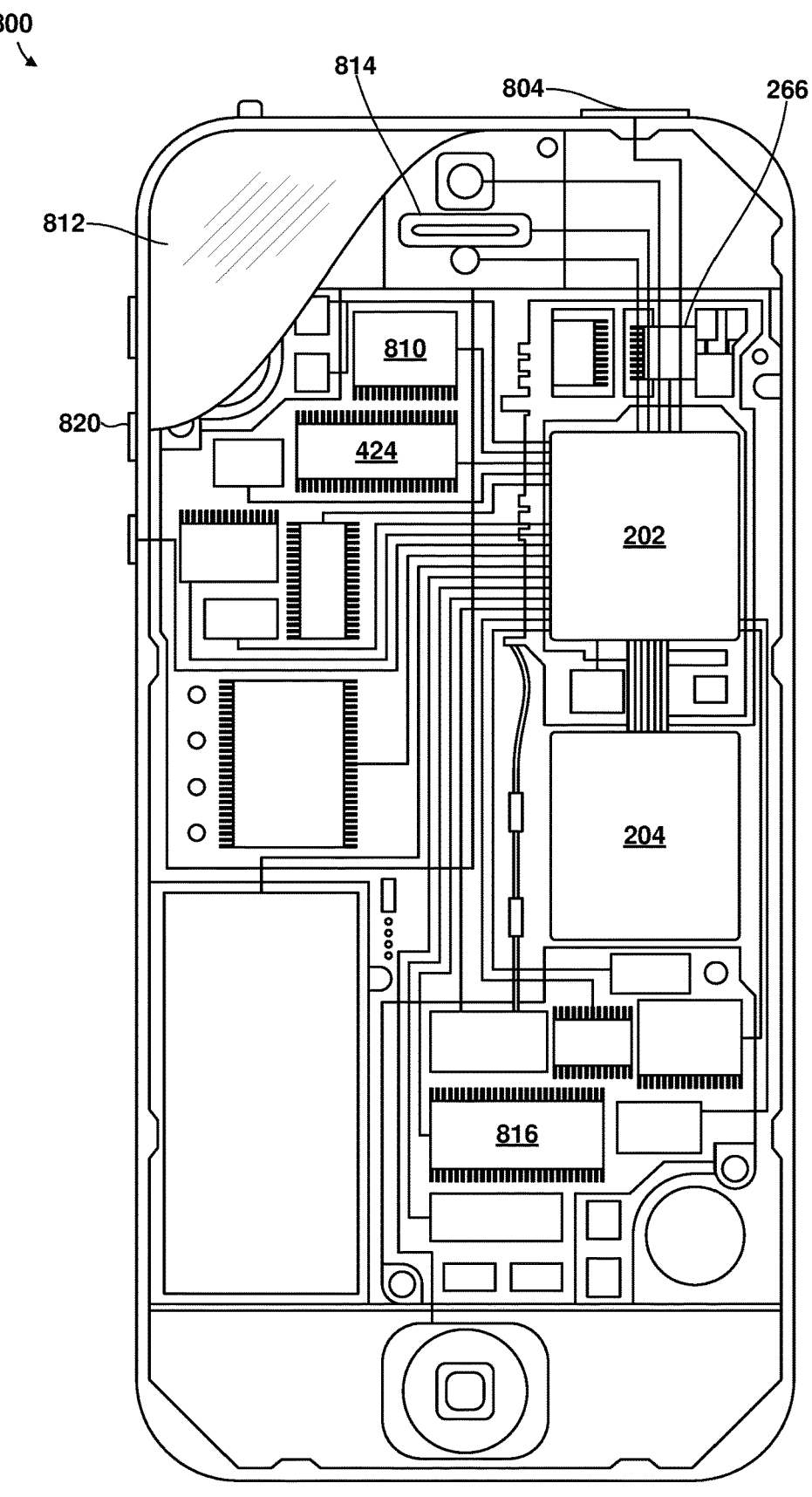
FIG. 8 is a component block diagram of a user equipment suitable for use with various embodiments.

FIG. 8 is a component block diagram of a user equipment 800 suitable for use with various embodiments. With reference to FIGS. 1-8, various embodiments may be implemented on a variety of user equipment 800 (e.g., the user equipment 120a-120e, 200, 320, 120a-120e), an example of which is illustrated in FIG. 8 in the form of a smartphone. The user equipment 800 may include a first SOC 202 (e.g., a SOC-CPU) coupled to a second SOC 204 (e.g., a 5G capable SOC). The first and second SOCs 202, 204 may be coupled to internal memory 424, 816, a display 812, and to a speaker 814. Additionally, the user equipment 800 may include an antenna 804 for sending and receiving electromagnetic radiation that may be connected to a wireless transceiver 266 coupled to one or more processors in the first and/or second SOCs 202, 204. The user equipment 800 may also include menu selection buttons or rocker switches 820 for receiving user inputs.

The user equipment 800 also includes a sound encoding/ decoding (CODEC) circuit 810, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 810 may include a digital signal processor (DSP) circuit (not shown separately).

The processors of the wireless network computing device 700 and the user equipment 800 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Software applications may be stored in the memory 424, 816 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a user equipment and the user equipment may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), LTE systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general Packet Radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then,"

"next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for recovering from packet switched (PS) call failure in a fifth generation (5G) non-standalone (NSA) network, comprising:
    determining, by a processor of a user equipment (UE), whether a total number of Evolved Packet System (EPS) bearer deactivation requests received from a base station of a 5G NSA network during a time period exceeds a maximum counter value; and
    disabling, by the processor, 5G data calls on the UE in response to determining that the total number of EPS bearer deactivation requests received from the base station of the 5G NSA network during the time period exceeds the maximum counter value.

2. The method of claim 1, further comprising:
    falling back, by the processor, to fourth generation (4G) mode for data calls in response to disabling 5G data calls on the UE.

3. The method of claim 1, further comprising:
    starting, by the processor, a back-off timer in response to disabling 5G data calls on the UE;
    determining, by the processor, whether the back-off timer has expired; and
    enabling, by the processor, 5G data calls on the UE in response to determining that the back-off timer has expired.

4. The method of claim 3, wherein the back-off timer expires one hour after starting.

5. The method of claim 3, further comprising:
    sending, by the processor, a first tracking area update request to the base station of the 5G NSA network prior to receiving any EPS bearer deactivation requests from the base station of the 5G NSA network, the first tracking area update request indicating dual connectivity with new radio (DCNR) is supported by the UE; and
    sending, by the processor, a second tracking area update request to the base station of the 5G NSA network in response to disabling 5G data calls on the UE, the second tracking area update request indicating DCNR is not supported.

6. The method of claim 1, wherein the time period is sixty seconds and the maximum counter value is five.

7. A user equipment (UE), comprising:
    a processor configured to:
        determine whether a total number of Evolved Packet System (EPS) bearer deactivation requests received from a base station of a fifth generation (5G) non-standalone (NSA) network during a time period exceeds a maximum counter value; and
        disable 5G data calls on the UE in response to determining that the total number of EPS bearer deactivation requests received from the base station of the 5G NSA network during the time period exceeds the maximum counter value.

8. The UE of claim 7, wherein the processor is further configured to:
    fallback to fourth generation (4G) for data calls in response to disabling 5G data calls on the UE.

9. The UE of claim 7, wherein the processor is further configured to:
    start a back-off timer in response to disabling 5G data calls on the UE;
    determine whether the back-off timer has expired; and
    enable 5G data calls on the UE in response to determining that the back-off timer has expired.

10. The UE of claim 9, wherein the back-off timer expires one hour after starting.

11. The UE of claim 9, wherein the processor is further configured to:
    send a first tracking area update request to the base station of the 5G NSA network prior to receiving any EPS bearer deactivation requests from the base station of the 5G NSA network, the first tracking area update request indicating dual connectivity with new radio (DCNR) is supported by the UE; and
    send a second tracking area update request to the base station of the 5G NSA network in response to disabling 5G data calls on the UE, the second tracking area update request indicating DCNR is not supported.

12. The UE of claim 7, wherein the time period is sixty seconds and the maximum counter value is five.

13. A user equipment (UE), comprising:
    means for determining whether a total number of Evolved Packet System (EPS) bearer deactivation requests received from a base station of a fifth generation (5G) non-standalone (NSA) network during a time period exceeds a maximum counter value; and
    means for disabling 5G data calls on the UE in response to determining that the total number of EPS bearer deactivation requests received from the base station of the 5G NSA network during the time period exceeds the maximum counter value.

14. The UE of claim 13, further comprising:
    means for falling back to fourth generation (4G) for data calls in response to disabling 5G data calls on the UE.

15. The UE of claim 13, further comprising:
    means for starting a back-off timer in response to disabling 5G data calls on the UE;
    means for determining whether the back-off timer has expired; and
    means for enabling 5G data calls on the UE in response to determining that the back-off timer has expired.

16. The UE of claim 15, wherein the back-off timer expires one hour after starting.

17. The UE of claim 15, further comprising:
    means for sending a first tracking area update request to the base station of the 5G NSA network prior to receiving any EPS bearer deactivation requests from the base station of the 5G NSA network, the first tracking area update request indicating dual connectivity with new radio (DCNR) is supported by the UE; and
    means for sending a second tracking area update request to the base station of the 5G NSA network in response to disabling 5G data calls on the UE, the second tracking area update request indicating DCNR is not supported.

18. The UE of claim 13, wherein the time period is sixty seconds and the maximum counter value is five.

19. A non-transitory processor readable medium having stored thereon processor-executable instructions configured to cause a processor of a user equipment (UE) to perform operations comprising:

determining whether a total number of Evolved Packet System (EPS) bearer deactivation requests received from a base station of a fifth generation (5G) non-standalone (NSA) network during a time period exceeds a maximum counter value; and disabling 5G data calls on the UE in response to determining that the total number of EPS bearer deactivation requests received from the base station of the 5G NSA network during the time period exceeds the maximum counter value.

20. The non-transitory processor readable medium of claim 19, wherein the stored processor-executable instructions are further configured to cause a processor of a UE to perform operations further comprising:

falling back to fourth generation (4G) for data calls in response to disabling 5G data calls on the UE.

21. The non-transitory processor readable medium of claim 19, wherein the stored processor-executable instructions are further configured to cause a processor of a UE to perform operations further comprising:

starting a back-off timer in response to disabling 5G data calls on the UE;

determining whether the back-off timer has expired; and enabling 5G data calls on the UE in response to determining that the back-off timer has expired.

22. The non-transitory processor readable medium of claim 21 wherein the stored processor-executable instructions are further configured to cause a processor of a UE to perform operations such that the back-off timer expires one hour after starting.

23. The non-transitory processor readable medium of claim 21, wherein the stored processor-executable instructions are further configured to cause a processor of a UE to perform operations further comprising:

sending a first tracking area update request to the base station of the 5G NSA network prior to receiving any EPS bearer deactivation requests from the base station of the 5G NSA network, the first tracking area update request indicating dual connectivity with new radio (DCNR) is supported by the UE; and sending a second tracking area update request to the base station of the 5G NSA network in response to disabling 5G data calls on the UE, the second tracking area update request indicating DCNR is not supported.

24. The non-transitory processor readable medium of claim 19, wherein the stored processor-executable instructions are further configured to cause a processor of a UE to perform operations such that the time period is sixty seconds and the maximum counter value is five.

* * * * *